Figures 1, 2, 3:
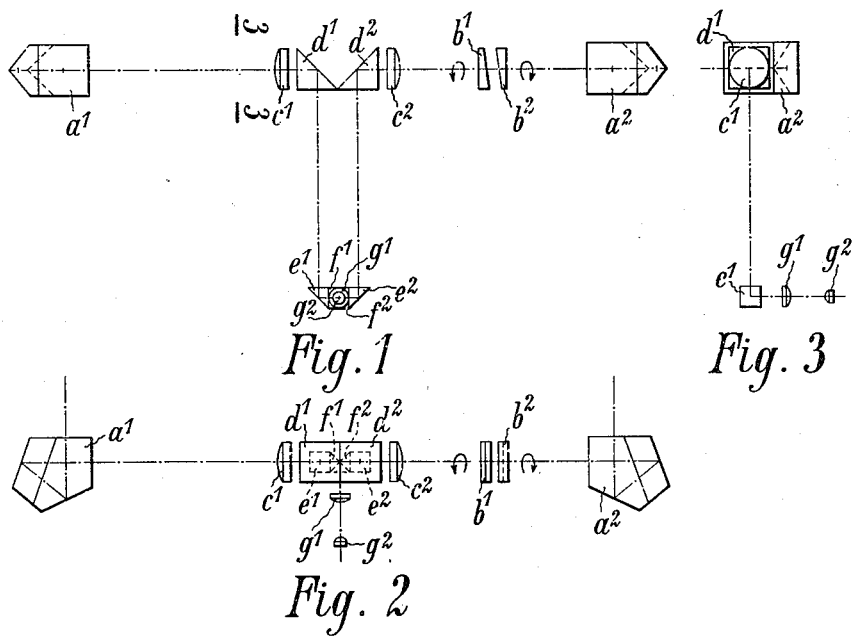

Dec. 11, 1923.
O. EPPENSTEIN
TELEMETER
Filed Aug. 13, 1921
1,477,112
3 Sheets-Sheet 2
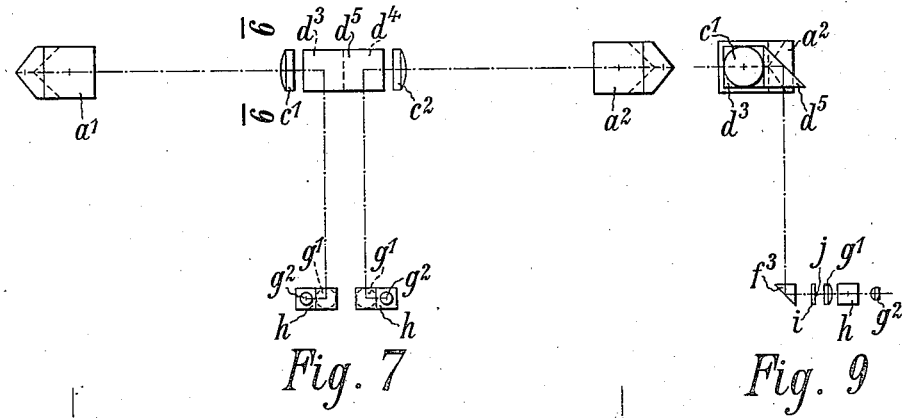
Fig. 7
Fig. 9
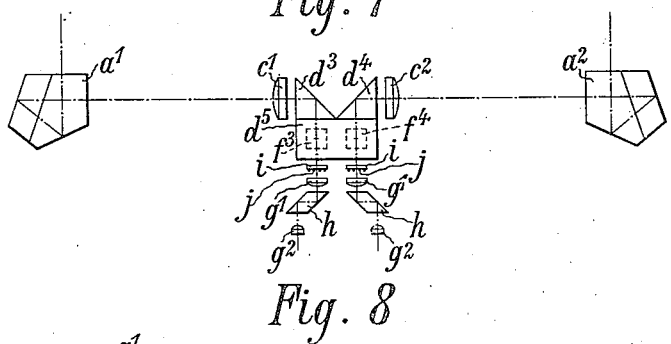
Fig. 8
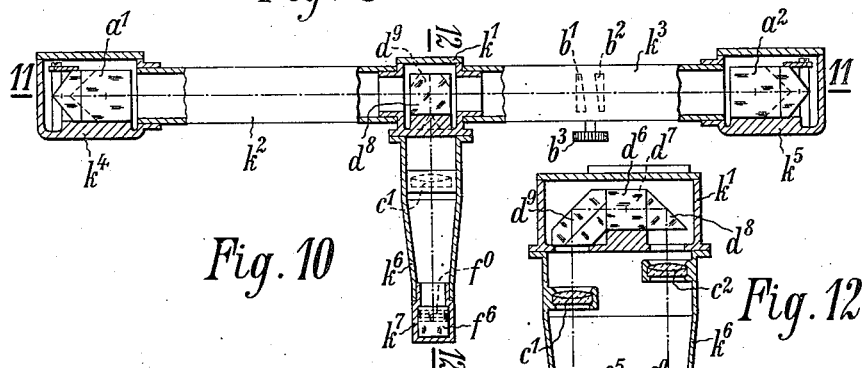
Fig. 10
Fig. 12
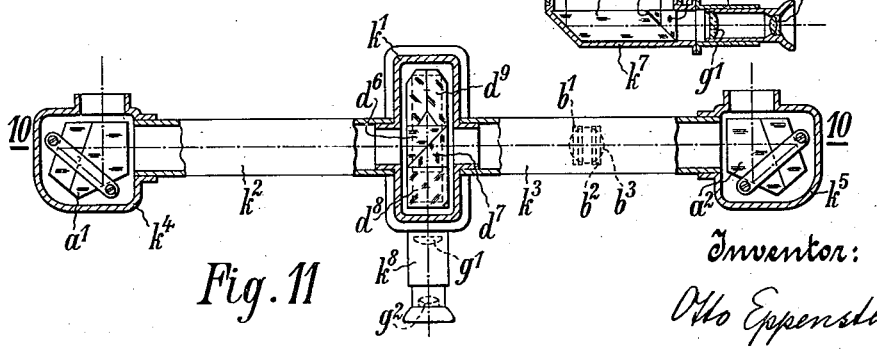
Fig. 11
Inventor:
Otto Eppenstein Dec. 11, 1923.  1,477,112
O. EPPENSTEIN
TELEMETER
Filed Aug. 13, 1921   3 Sheets-Sheet 3

Inventor:
Otto Eppenstein

Patented Dec. 11, 1923.

1,477,112

UNITED STATES PATENT OFFICE.

OTTO EPPENSTEIN, OF JENA, GERMANY, ASSIGNOR TO THE FIRM OF CARL ZEISS, OF JENA, GERMANY.

TELEMETER.

Application filed August 13, 1921. Serial No. 492,104.

(GRANTED UNDER THE PROVISIONS OF THE ACT OF MARCH 3, 1921, 41 STAT. L., 1313.)

*To all whom it may concern:*

Be it known that I, OTTO EPPENSTEIN, a citizen of the German Empire and residing at Jena, Germany, have invented a new and useful Telemeter (for which I have filed an application in Germany, March 8, 1917, Patent No. 302,436; Austria, April 12, 1918; Italy, July 6, 1920; England, July 7, 1920, Patent No. 147,106; France, September 18, 1920; and Spain, March 3, 1921), of which the following is a specification.

The present invention relates to a telemeter, which contains a horizontal base-line within itself, the entrance apertures of which lie above the head of the observer and in which behind each of the two entrance apertures an objective reflecting system, which is non-sensitive to rotations in the plane of measurement, deflects the ray pencil system, which has entered through the corresponding entrance aperture, in the direction of the base-line at the height of the corresponding entrance aperture. Of this type of telemeter only one single kind has up to the present become known, viz, that dealt with in the Austrian Patent 38,463. In this known kind the separating prism system also lies at the height of the entrance apertures; this position of the separating prism system made it possible in the case mentioned to combine this prism system and the objectives, each lying in front of it at the focal length, in a rigid tubular system (extending in the direction of the base-line), externally of which no parts influencing the accuracy of the measurement need lie. The length of this tubular system was about equal to double the length of the focal length of the objectives.

In the new telemeter the separating prism system lies at the height of the ocular lenses and the objectives of the telemeter lie near that reflecting system which in the new telemeter must be added to the otherwise necessary optical parts, for deflecting the ray pencil systems coming from the objective reflecting systems out of the direction of the base-line. This arrangement of the separating prism system on the one hand and of the objectives on the other hand makes it possible with the new telemeter, to combine the separating prism system, the objectives and the newly added reflecting system mentioned above in a rigid tubular system (extending in a direction perpendicular to that of the base-line), the length of which is only about equal to the focal length of the objectives and which can consequently be more easily made sufficiently resistant to alterations in form. Under certain circumstances with the new telemeter the otherwise usual inner tube, which carries the important optical parts and which is not influenced by distortions of the outer tube of the telemeter, may be dispensed with.

When the construction of the additional reflecting system and of the separating prism system is suitably chosen, in the new telemeter no relative movements of the two images presented to the observer take place in the direction of the base-line, even when the separating prism system suffers slight changes of its position relatively to the objectives and the additional reflecting system, so that in this case the said tubular system need not satisfy any special demands on its power of resistance. Each such change of position may be considered as resulting from at most three displacements and at most three rotations, viz, from a displacement in the direction of the axis of inspection, a displacement in the direction of the base-line and a displacement in a direction perpendicular to the two said directions, and from a rotation about the axis of inspection, a rotation about the base-line and a rotation about an axis intersecting the two just named axes perpendicularly. A more or less considerable non-sensitiveness in the meaning just described may be particularly easily effected, if the additional reflecting system be constructed in such a manner that the two reflections, by which the one and the other of the two ray pencil systems is transmitted to the ocular prism system, each occur in a plane perpendicular to the base-line. The extension of the additional reflecting system in the direction of the base-line becomes particularly small and thereby the build of the said tubular system particularly squat in this direction, if these two reflections are caused to take place in one and the same plane.

When the invention is applied to a stereoscopic telemeter, in which, when a measurement is being made, the apparent distance of a spatial image of the object to be measured is compared with the apparent distance of a stereoscopic measuring mark, the mark images giving this measuring mark together with the prisms that may lie between them and the objectives play the part, from the point of view of the case under discussion, of the separating prism system of a uniocular telemeter.

Figures 4, 5, 6:
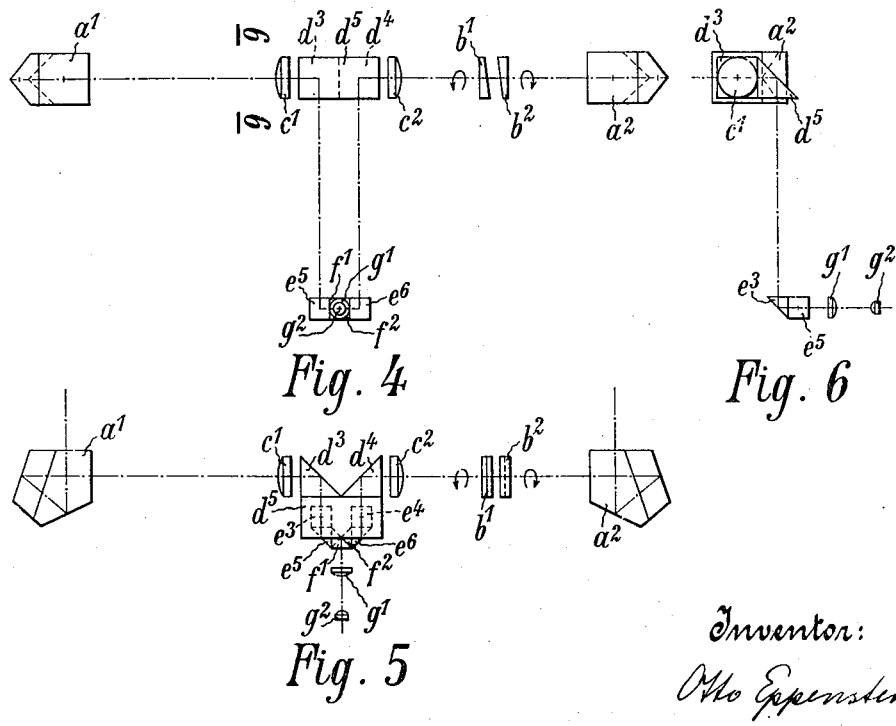
Figure 13:
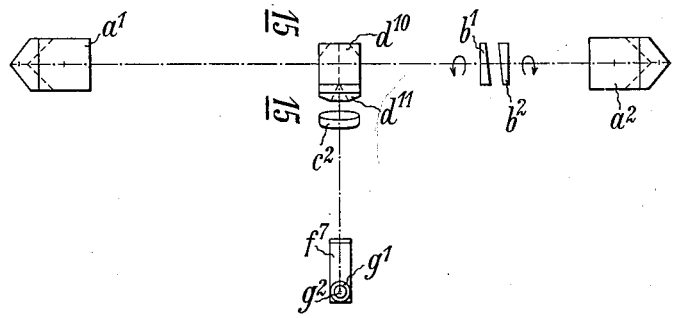
Figure 14:
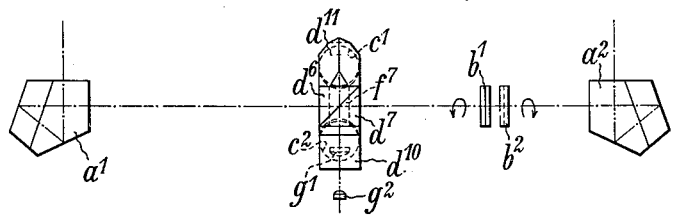
Figure 15:
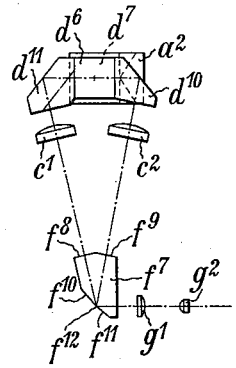

In the drawing the invention is illustrated by several constructional examples. In the first example (Figs. 1 to 3) the optical system of a coincidence telemeter is shown, which presents two erect images to the observer; Fig. 1 is an elevation from the ocular side, Fig. 2 a top view and Fig. 3 a cross section on line 3—3 of Fig. 1. In the second example (Figs. 4 to 6) the optical system of such a telemeter is also shown; Fig. 4 is an elevation from the ocular side, Fig. 5 a top view and Fig. 6 a cross section on line 6—6 of Fig. 4. In the third example (Figs. 7 to 9) the optical system of a stereoscopic telemeter is shown; Fig. 7 is an elevation from the ocular side, Fig. 8 a top view and Fig. 9 a cross section on line 9—9 of Fig. 7. In the fourth example (Figs. 10 to 12) a constructional embodiment of a coincidence telemeter is shown; Fig. 10 is an elevation from the ocular side on line 10—10 of Fig. 11, Fig. 11 a top view on line 11—11 of Fig. 10 and Fig. 12 a cross section on line 12—12 of Fig. 10. In the fifth example (Figs. 13 to 15) the optical system of a telemeter is shown, that is similar to that of the fourth example. Fig. 13 is an elevation from the ocular side, Fig. 14 a top view and Fig. 15 a cross section on line 15—15 of Fig. 13.

In the first example (Figs. 1 to 3) the objective reflecting systems are formed by two pentagonal prisms $a^1$ and $a^2$, of each of which one reflecting surface is formed as a ridge. The measuring device is indicated by two refracting wedges $b^1$ and $b^2$, which are rotatable relatively to one another. They lie immediately in front of the additional reflecting system, which is disposed in the centre of the base-line and consists of two simple reflecting prisms $d^1$ and $d^2$, each of which deflects the corresponding axial ray by a reflection in a plane containing the base-line and perpendicular to the plane of measurement, through 90°. The separating prism system consists of two simple reflecting prisms $e^1$ and $e^2$, of which $e^1$ again deflects the axial ray belonging to the left hand end of the base-line and $e^2$ the axial ray belonging to the right hand end of the base-line in the direction of the base-line, and of two simple reflecting crossed prisms $f^1$ and $f^2$, which are each half as high as the prisms $e^1$ and $e^2$ and act in a known manner. The ocular of the telemeter consists of a field lens $g^1$ and an eye lens $g^2$. As a simple enquiry will show, of the above named three displacements and three rotations in this case only a displacement of the separating prism system in the direction of the axis of inspection or a rotation of the ocular prism system about the base-line would effect a relative movement of the two images presented to the observer in the direction of the base-line; the other two displacements and the other two rotations on the other hand would have no such effect.

In the second example (Figs. 4 to 6) the objective reflecting systems $a^1$ and $a^2$, the measuring device $b^1$, $b^2$, the objectives $c^1$ and $c^2$ and the ocular lenses $g^1$ and $g^2$ are similar to those of the first example. The additional reflecting system consists of two simple reflecting prisms $d^3$ and $d^4$, each of which deflects the corresponding axial ray in a plane parallel to the plane of measurement through 90°, and of a simple reflecting prism $d^5$, which receives the two ray pencil systems emerging from the prisms $d^3$ and $d^4$, and deflects the axial rays through 90° in a plane perpendicular to the base-line. The separating prism system consists of two simple reflecting prisms $e^3$ and $e^4$, each of which deflects the axial ray passing through by 90° in a plane perpendicular to the base-line, two simple reflecting prisms $e^5$ and $e^6$, each of which deflects the axial ray passing through by 90° in a plane parallel to the plane of measurement, and two crossed prisms $f^1$ and $f^2$, which are similar to those of the first example. None of the displacements and rotations of the separating prism system, mentioned, would in this case cause a relative movement of the two images in the direction of the base-line.

The third example (Figs. 7 to 9) is similar to the second example as regards the objective reflecting system $a^1$ and $a^2$, the objectives $c^1$ and $c^2$, and the additional reflecting system $d^3$, $d^4$, $d^5$. Two simple reflecting prisms $f^3$ and $f^4$ each deflect the axial ray passing through by 90° in a plane perpendicular to the base-line. Each of the oculars consists of a field lens $g^1$ and an eye lens $g^2$, between which a twice reflecting prism $h$ of diamond-shaped cross-section is disposed, so that, by rotating the oculars each about the entering axial ray, the relative distance of the axes of inspection of the telemeter can be adapted to the interocular distance of the observer. In front of each of the two oculars there is a plano-parallel glass plate $i$, the rear surface of which lies in the focal plane of the corresponding ocular and is fitted with marks $j$ in such a manner that, when observing with both eyes, there results from the marks of the two oculars a series of stereoscopic measuring marks. None of the displacements and rotations of the ocular prism system, mentioned, would in this case cause a relative movement of the two images in the direction of the base-line.

In the fourth example (Figs. 10 to 12) the main body of the telemeter consists of a middle part $k^1$, with which are connected by means of two tubes $k^2$ and $k^3$ two head pieces $k^4$ and $k^5$. In the head piece $k^4$ a pentagonal prism $a^1$ and in the head piece $k^5$ a pentagonal prism $a^2$ is mounted; one surface of each of these pentagonal prisms is formed as a ridge surface. The measuring device is indicated by two refracting prisms $b^1$ and $b^2$ fitted in the tube $k^3$, the knob $b^3$ serving for their relative rotation. The additional reflecting system consists of three simple reflecting prisms $d^6$, $d^7$ and $d^8$ and a ridge prism $d^9$. The prism $d^6$ receives the ray pencil system coming from the left hand end of the base-line and deflects the axial ray in the plane of measurement through 90° in the direction towards the object to be measured. The prism $d^7$ receives the ray pencil system coming from the right hand end of the base-line and deflects the axial ray in the plane of measurement through 90° in the opposite manner to the other axial ray in such a manner that the two axial rays lie in a straight line. The prism $d^9$ deflects the ray that has emerged from the prism $d^6$ and the prism $d^8$ that which has emerged from the prism $d^7$, through 90° in a plane perpendicular to the base-line. To the middle part $k^1$ there is attached a flat tube $k^6$, which contains two objectives $c^1$ and $c^2$ and carries at the bottom a casing $k^7$, in which the ocular prism system is mounted. The separating prism system consists of a prism $f^5$ of diamond-shaped cross-section, to which a reflecting prism $f^6$ is cemented. The upper half of the cement layer is formed as a separating layer reflecting on both sides, while the lower half allows the rays falling on it to pass through. The ray pencil system coming from the left hand end of the base-line is received by the prism $f^5$, that coming from the right hand end by the prism $f^6$. Into a sleeve $k^8$ attached to the casing $k^7$ the ocular is slid, the field lens of which is marked $g^1$ and the eye lens $g^2$. The filling of the lower half of the image field comes from the left hand end of the base-line and is an image inverted perpendicularly to the base-line direction, the filling of the upper half of the image-field comes from the right hand end of the base-line and is an erect image. Of the displacements and rotations of the separating prism system, mentioned, in this case only a rotation about the axis intersecting the axis of inspection and the base-line perpendicularly would cause a relative movement of the two images in the direction of the base-line; the influence of this rotation is the smaller, the smaller the relative distance of the two points in which by the prisms $f^5$ and $f^6$ one axial ray and the other is deflected in the direction of the ocular axis.

The fifth example (Figs. 13 to 15) is the optical system of a coincidence telemeter, which is similar to the fourth example as regards the filling of the image-field, but is so altered in its optical system that it is sensitive to none of the displacements and rotations mentioned in the above respect. The optical system of the fifth example is similar as regards its objective reflecting systems $a^1$ and $a^2$, its measuring device $b^1$, $b^2$ and its ocular $g^1$, $g^2$ to the corresponding optical parts of the fourth example. The additional reflecting system consists, similarly to the additional reflecting system of the fourth example, of three simple reflecting prisms $d^6$, $d^7$ and $d^{10}$ and of a ridge prism $d^{11}$, but the prisms $d^{10}$ and $d^{11}$ each deflect the axial ray through more than 90°. The objectives $c^1$ and $c^2$ are arranged below the additional reflecting system in such a manner that the focus of each of the two lenses coincides with the point of intersection of the two axial rays. The separating prism system consists of a single glass body $f^7$. The two entrance surfaces $f^8$ and $f^9$ are each pierced by the corresponding axial ray unrefracted. Two reflecting surfaces $f^{10}$ and $f^{11}$, which act by total reflection and are inclined to one another, are so disposed that the edge $f^{12}$, in which these two surfaces intersect, lies parallel to the base-line and contains the point of intersection of the two axial rays. The ocular $g^1$, $g^2$ receives the ray pencil system coming from the objective $c^1$ only partially, which impinges on the reflecting surface $f^{11}$, and receives only a portion of the ray pencil coming from the objective $c^2$, which impinges on the reflecting surface $f^{10}$. The edge $f^{12}$ consequently acts as separating edge. As the relative distance of the two points, in which in the separating prism system the one axial ray and the other is deflected in the direction of the ocular axis, is equal to zero, in this case, as already remarked, none of the mentioned displacements and rotations of the separating prism system would cause a relative movement of the two images in the direction of the base-line.

I claim:

1. In a telemeter, the entrance apertures of which lie above the head of the observer, an objective reflecting system disposed behind each of the two entrance apertures and non-sensitive to rotations in the plane of measurement, the said reflecting system deflecting the ray pencil system, entering through the corresponding entrance aperture, in the direction of the base-line of the telemeter at the height of the corresponding entrance aperture, a separating prism system, an ocular system lying at the height of the said separating prism system, another reflecting system which transmits the two ray pencil systems to the said separating prism system, deflecting them out of the direction of the base-line, and two objectives lying near the last named prism system.

2. In a telemeter, the entrance apertures of which lie above the head of the observer, an objective reflecting system disposed behind each of the two entrance apertures and non-sensitive to rotations in the plane of measurement, the said reflecting system deflecting the ray pencil system, entering through the corresponding entrance aperture, in the direction of the base-line of the telemeter at the height of the corresponding entrance aperture, a separating prism system, an ocular system lying at the height of the said separating prism system, another reflecting system which transmits the two ray pencil systems to the said separating prism system, deflecting them out of the said base-line, the said second reflecting system deflecting each of the said two ray pencil systems twice, the second deflection taking place in a plane perpendicular to the said base-line, and two objectives lying near the last named prism system.

3. In a telemeter, the entrance apertures of which lie above the head of the observer, an objective reflecting system disposed behind each of the two entrance apertures, and non-sensitive to rotations in the plane of measurement, the said reflecting system deflecting the ray pencil system, entering through the corresponding entrance aperture in the direction of the base-line of the telemeter at the height of the corresponding entrance aperture, a separating prism system, an ocular system lying at the height of the said separating prism system, another reflecting system which transmits the two ray pencil systems to the said separating prism system, deflecting them out of the direction of the said base-line, the said second reflecting system deflecting each of the said two ray pencil systems twice, the second deflection of the one ray pencil system taking place in the same plane as that of the other one, and two objectives lying near the last named prism system.

4. In a uniocular telemeter, the entrance apertures of which lie above the head of the observer, an objective reflecting system disposed behind each of the two entrance apertures and non-sensitive to rotations in the plane of measurement, the said reflecting system deflecting the ray pencil system, entering through the corresponding entrance aperture, in the direction of the base-line of the telemeter at the height of the corresponding entrance aperture, a separating prism system, an ocular system lying at the height of the said separating prism system, another reflecting system which transmits the two ray pencil systems to the said separating prism system, deflecting them out of the direction of the said base-line, and making the two axial rays convergent to the line separating the two half-images presented to the observer and two objectives lying near the last named prism system.

OTTO EPPENSTEIN.